United States Patent
Chen (10) Patent No.: US 11,306,410 B2
(45) Date of Patent: Apr. 19, 2022

(54) ANTI-COKING NANOMATERIAL BASED ON STAINLESS STEEL SURFACE, AND PREPARATION METHOD THEREFOR

(71) Applicant: SHENZHEN CANDORTECH INCORPORATED COMPANY, Shenzhen (CN)

(72) Inventor: Chao Chen, Shenzhen (CN)

(73) Assignee: SHENZHEN CANDORTECH INCORPORATED COMPANY, Shenzhen (CN)

( * ) Notice: Subject to any disclaimer, the term of this patent is extended or adjusted under 35 U.S.C. 154(b) by 512 days.

(21) Appl. No.: 16/326,174

(22) PCT Filed: Aug. 16, 2017

(86) PCT No.: PCT/CN2017/097663
§ 371 (c)(1),
(2) Date: Feb. 15, 2019

(87) PCT Pub. No.: WO2018/033098
PCT Pub. Date: Feb. 22, 2018

(65) Prior Publication Data
US 2019/0186036 A1    Jun. 20, 2019

(30) Foreign Application Priority Data

Aug. 16, 2016 (CN) .......................... 201610675706.7

(51) Int. Cl.
| C25D 9/10 | (2006.01) |
| C23G 1/19 | (2006.01) |
(Continued)

(52) U.S. Cl.
CPC ............. *C25D 9/10* (2013.01); *B01D 3/10* (2013.01); *C10G 75/02* (2013.01); *C21D 1/18* (2013.01); *C23C 8/02* (2013.01); *C23C 8/42* (2013.01); *C23C 22/24* (2013.01); *C23C 22/78* (2013.01); *C23F 1/14* (2013.01); *C23F 1/40* (2013.01);
(Continued)

(58) Field of Classification Search
None
See application file for complete search history.

(56) References Cited

U.S. PATENT DOCUMENTS 4,640,817 A * 2/1987 Kajimura ................ C22C 38/40
148/325

FOREIGN PATENT DOCUMENTS

CN          102691059 A  *  9/2012   ............. C25D 11/38

OTHER PUBLICATIONS

Machine Translation of CN-102691059-A (Year: 2012).*

* cited by examiner

*Primary Examiner* — Shamim Ahmed
*Assistant Examiner* — Bradford M Gates
(74) *Attorney, Agent, or Firm* — Lewis Roca Rothgerber Christie LLP (57) ABSTRACT

An anti-coking nanomaterial based on a stainless steel surface. In percentage by weight, the nanomaterial comprises: 0 to 3% of carbon, 23% to 38% of oxygen, 38% to 53% of chromium, 10% to 35% of ferrum, 0 to 2% of molybdenum, 0 to 4% of nickel, 3.5 to 5% of silicon, 0 to 1% of calcium, and the balance of impurity elements. Also disclosed are a preparation method for the anti-coking nanomaterial, the anti-coking nanomaterial that is based on a stainless steel surface and that is prepared by using the preparation method, and a stainless steel substrate comprising the anti-coking nanocrystalline material.

6 Claims, 5 Drawing Sheets

(51) Int. Cl.
    *C23C 22/24*     (2006.01)
    *C25D 3/08*     (2006.01)
    *C23C 22/78*     (2006.01)
    *C23F 1/40*     (2006.01)
    *B01D 3/10*     (2006.01)
    *C10G 75/02*     (2006.01)
    *C21D 1/18*     (2006.01)
    *C23C 8/02*     (2006.01)
    *C23C 8/42*     (2006.01)
    *C23F 1/14*     (2006.01)
    *C25D 15/00*     (2006.01)

(52) U.S. Cl.
    CPC ................. *C23G 1/19* (2013.01); *C25D 3/08* (2013.01); *C25D 15/00* (2013.01)

ANTI-COKING NANOMATERIAL BASED ON STAINLESS STEEL SURFACE, AND PREPARATION METHOD THEREFOR

CROSS-REFERENCE TO RELATED APPLICATION(S)

This application is a U.S. National Phase Patent Application of International Application Number PCT/CN2017/097663, filed on Aug. 16, 2017, which claims priority of Chinese Patent Application Number 201610675706.7, filed on Aug. 16, 2016, the entire contents of all of which are incorporated herein by reference.

TECHNICAL FIELD

The present invention belongs to the field of oil refining, petrochemical, chemical industry and petroleum product processing equipment, in particular to an anti-coking nanomaterial based on stainless steel surface used in high corrosion industry environment such as oil refining, petrochemical, petroleum processing, chemical industry and so on and preparation method thereof.

BACKGROUND ART

The problems such as coking, scaling and clogging existing in petrochemical pipelines, heat exchangers, tower internal packing, boilers and furnace tubes under high temperature conditions have always negatively affected the normal production and operation of enterprises. At present, there are more researches on anti-coking in furnace tubes than other fields. For example, the coking and scaling in the refinery heat exchanger and the tower internal packing caused by high temperature have great influence on the heat exchange and separation efficiency. The longer the time is, the more serious the coking and scaling are. When the coking and scaling amount is accumulated to a certain amount, this will cause serious accidents and have to shut down for maintenance, replace the coked tower internal packing, or clean the coked and scaled heat exchanger. Long-term scaling of the pipeline will affect the efficiency of the pump and increases the load of the pump, especially when the coking block is excessive and falls off, the downstream equipment will be blocked. Therefore, the research on the anti-coking of stainless steel surface-based nanomaterials in oil refining and chemical industry has unique significance.

At present, there are many methods for anti-coking. The most common method is to study the surface materials of devices and prepare new film layer materials as for different application environments. These methods mainly contain 1. adding anti-coking layers such as silica, ceramics and so on as for surface aluminizing in high temperature furnace tubes; 2. adding anti-coking inhibitor in materials such as heavy oil; 3. surface-spraying the anti-coking paint as for the positions which are easy to coke; 4. combing the inhibitor and the painting layer to resist coking.

Anti-coking paint is a commonly used anti-coking method. For example, Chinese patent applications CN105111854A, CN103421531A, CN102585571A improve the anti-coking effect by various kinds of painting layers.

Adding anti-coking inhibitors into raw materials such as heavy oil is also a wildly used method for anti-coking currently, especially in the furnace tubes of cracking furnaces. For example, Chinese patent applications CN102251225A and CN103421531A add inhibitor into raw materials fluid to resist coking.

The method that improves the anti-coking effect by treating the surface of the furnace tubes, heat exchangers and boilers, which is easy to coke, is a commonly used method having good anti-coking effect. For example, Chinese patent application CN103861662A achieves the anti-coking effect by adding aluminum into metal surface, Chinese patent application CN105200338A increases the anti-coking effect by adding Mn and Si into metal surface, Chinese patent application CN101379362A increases the anti-coking effect by adding various kinds of rare metal elements.

Though the existing anti-coking paints have good anti-coking effects, the adhesion between paint and substrate is always insufficient. Under high temperature and high fluid flow rate environment, the paint is easy to fall off, which significantly affects the anti-coking effect. The method is mainly used for the devices for holding liquid now.

The application of coating is limited because it can be hardly coated in the internal parts of complex equipment. Meanwhile, anti-coking inhibitors can cause effect on downstream processes or final products, they are generally used in combination with other anti-coking methods. Therefore, the combined use of inhibitor and coating is also a commonly used anti-coking method. The combined use of multiple anti-coking methods can inhibit coking to maximum extent, as described in Chinese patent application CN102251225A.

Therefore, the treatment of the surface of stainless steel is the most widely studied anti-coking technology nowadays. However, different anti-coking processes may bring different anti-coking effects. The cost is high or low. At present, the usual method is to replace or clean to achieve anti-coking, which causes great effect on the process.

SUMMARY OF THE INVENTION

The object of the present invention is to provide an anti-coking nanomaterial based on stainless steel surface. The anti-coking nanomaterial is composed of metal oxides such as chromium oxide and silicon oxide, and can act on various types of stainless steel substrates, and can reduce the coking amount up to more than 30% when compared with a conventional stainless steel substrate. The surface of the anti-coking nanomaterial based on the stainless steel surface will become smoother after being treated by electrochemical method. There is no obvious bonding interface when the anti-coking nanomaterial based on the stainless steel surface is combined with the substrate in an inlaid manner. In addition, because the thermal expansion coefficient of the surface of the anti-coking nanomaterial is equivalent to that of the substrate, the anti-coking nanomaterial will not fall off from the stainless steel substrate when placing in a high-temperature medium whose temperature fluctuates repeatedly for a long time. The processes such as the pre-treating and post-treating of the anti-coking nanomaterial are carried out under normal temperature and pressure, which are easy to be industrialized and applied to large-scale stainless steel devices.

The technical solution for achieving the above object is as follows:

The present invention provides an anti-coking nanocrystalline material based on a stainless steel surface, comprising, expressed in percentage by weight, 0-3% of carbon, 23-38% of oxygen, 38-53% of chromium, 10-35% of iron, 0-2% of molybdenum, 0-4% of nickel, 3.5-5% of silicon, 0-1% of calcium and with the balance being impurity elements.

Preferably, the nanocrystalline material contains, expressed in percentage by weight, 0.71% of carbon, 34.62% of oxygen, 42.81% of chromium, 13.11% of iron, 3.1% of nickel, 4.73% of silicon, 0.92% of calcium with the balance being impurity elements.

The present invention also provides a method for preparing the anti-coking nanocrystalline material, comprising the following steps:

(1) chemically degreasing and etching with alkali a stainless steel surface using a sodium hydroxide solution and a solution containing an alkali etching additive, followed by washing with water;

(2) oxidizing the stainless steel surface treated in the step (1) by an oxidizing solution, followed by washing with water;

(3) immersing the stainless steel surface treated in the step (2) as a cathode in an electrolyte to electrolyze, followed by washing with water;

(4) placing the stainless steel surface treated in the step (3) at a temperature of 50-60° C. and a humidity of 60-70%, and then placing at a temperature of 35-40° C. and a humidity of 40-50% for hardening.

Preferably, in the step (1), the temperature of the sodium hydroxide solution and the solution containing the alkali etching additive is 80-85° C.

Preferably, the concentration of the sodium hydroxide solution is 6.5-8%.

Preferably, the concentration of the solution containing the alkali etching additive is 0.3-0.5%.

Preferably, the alkali etching additive is HDW-1050 alkali etching additive.

Preferably, the chemically degreasing and etching with alkali treatment is carried out for 10-15 minutes.

Preferably, the washing with water is performed cyclically by using water with a temperature of 80-85° C., preferably, the time for the washing is 3-5 minutes.

Preferably, in the step (2), the oxidizing solution contains 200-300 g/L of $CrO_3$;

Preferably, the temperature of the oxidizing solution is 75-90° C.

Preferably, the pH of the oxidizing solution is 0.4-1.5; preferably, the pH of the oxidizing solution is adjusted to 0.4-1.5 by adding a $H_2SO_4$ solution into the oxidizing solution; preferably, the concentration of the $H_2SO_4$ solution is 98%.

Preferably, the time for oxidizing is 15-35 minutes.

Preferably, the washing with water after oxidizing in the step (2) is performed cyclically by using water at 25-40° C. for 3-5 minutes; preferably, the pH of the water is >3.

Preferably, in the step (3), the electrolyte contains 100-150 g/L of $CrO_3$, 80-100 g/L of $Na_2SiO_3$, 15-20 g/L of nano silicon nitride, 3-5 g/L of nano silicon carbide.

Preferably, the temperature of the electrolyte is 40-52° C.

Preferably, the pH of the electrolyte is 0.5-1.5; preferably, the pH of the electrolyte is adjusted to 0.5-1.5 by adding a $H_2SO_4$ solution into the electrolyte; preferably, the concentration of the $H_2SO_4$ solution is 98%.

Preferably, the current for electrolyzing is direct current; preferably, the intensity of the current is 42-4 A/m$^2$; preferably, the initial current intensity is 40-42 A/m$^2$, and then the current intensity is gradually reduced to 4 A/m$^2$ according to the formula $i=3+30/t$, wherein $i$ is current intensity and $t$ is time.

Preferably, the time for electrolyzing is 25-55 minutes; preferably, the electrolysis comprises electrolyzing for 10-25 minutes at an initial current intensity of 40-42 A/m$^2$, and then electrolyzing at a current intensity gradually reduced to 4 A/m$^2$ according to the formula $i=3+30/t$ during 14-18 minutes.

Preferably, the washing with water is performed cyclically by using water at 25-40° C. for 3-5 minutes; preferably, the pH of the water is >3.

Preferably, in the step (4), the time for hardening treatment by placing twice is respectively 3-3.5 hours and 48-72 hours.

The invention also provides an anti-coking nanomaterial based on stainless steel surface prepared according to the method of the present invention.

The invention further provides a stainless steel substrate containing the anti-coking nanomaterial.

To explain the objects, the technical features and the beneficial effects of the present invention more detailedly, the anti-coking nanomaterials of the present invention will be further described below in combined with 304, 316L, 317L and OCr13 stainless steels.

Figure 1:
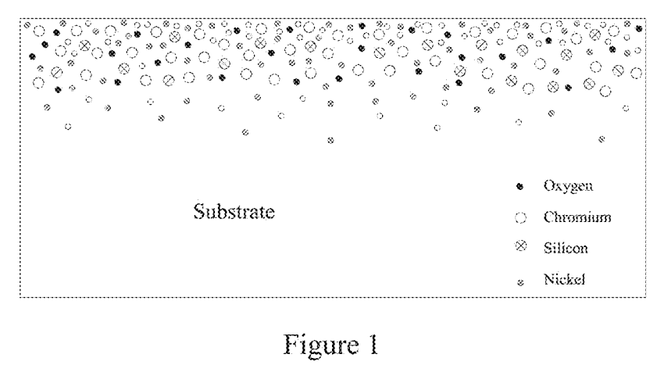
FIG. 1 is an element distribution diagram of surface of an anti-coking nanomaterial based on a 304 substrate.
Figure 2:
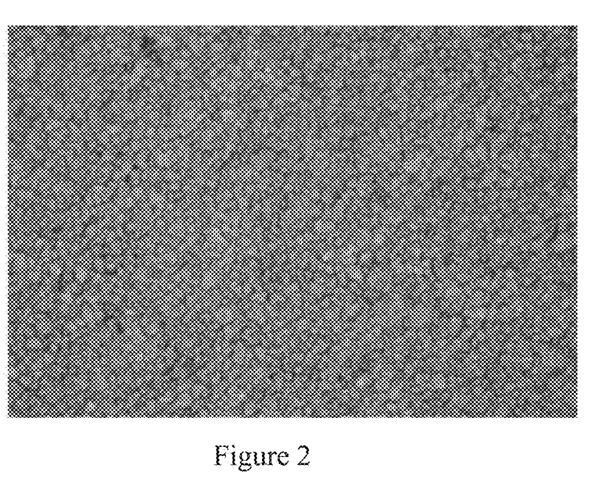
FIG. 2 is an element SEM crystal diagram of surface of an anti-coking nanomaterial based on a 304 substrate.

According to the present invention, the anti-coking nanomaterial layer formed on the stainless steel surface is combined with the stainless steel substrate in an inlaid manner. The stainless steel substrate forms a honeycomb substrate structure from the shallower to the deeper on the surface, and the voids of the honeycomb substrate structure are filled and embedded with the anti-coking nanomaterial of the present invention. There is no combining interface between the stainless steel substrate and the nanomaterial, and, the thermal expansion of the stainless steel substrate and the nanomaterial will not lead to obvious fault layers. When the temperature of the contacting medium fluctuates continuously and significantly, such inlaid manner will keep the film layer between the nanomaterial and the stainless steel substrate from falling off. The adhesion of the nanomaterials far exceeds of that of the anti-coking paints. Specifically, as shown in FIG. 1, the blank area is, for example, a 304 stainless steel substrate. The anti-coking nanomaterial of the present invention is combined with the 304 stainless steel substrate by means of being dense in the surface and sparse in inner layer. The inlaid manner (embedded combination mode) of chromium oxide and silicon oxide surface layer of the nanomaterial with the substrate is shown in FIG. 2.

Figure 3:
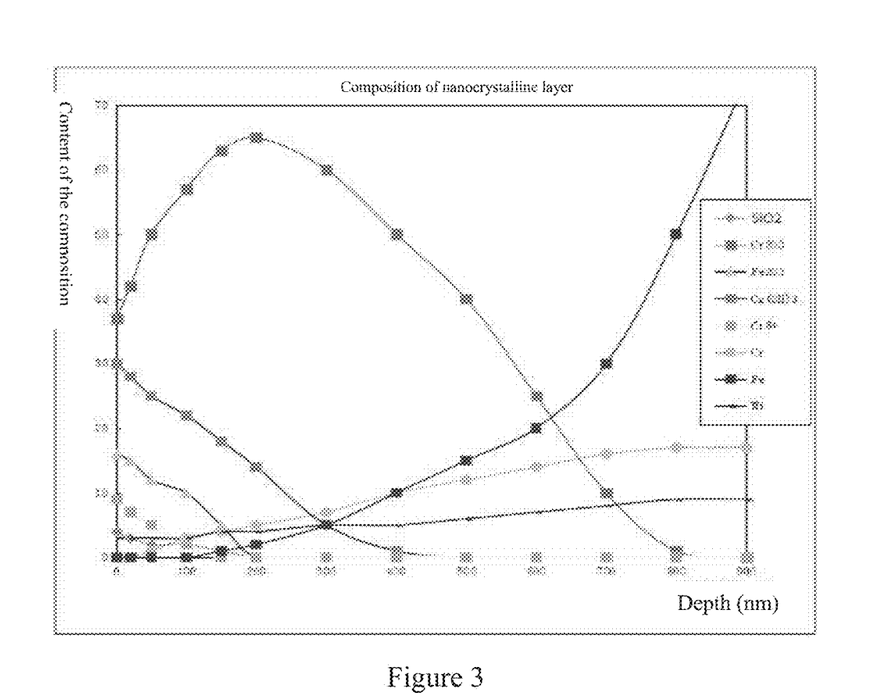
FIG. 3 is a trend chart of material composition layer of the nanocrystalline material according to the present invention analyzed by X-ray photoelectron spectroscopy.
Figure 4:
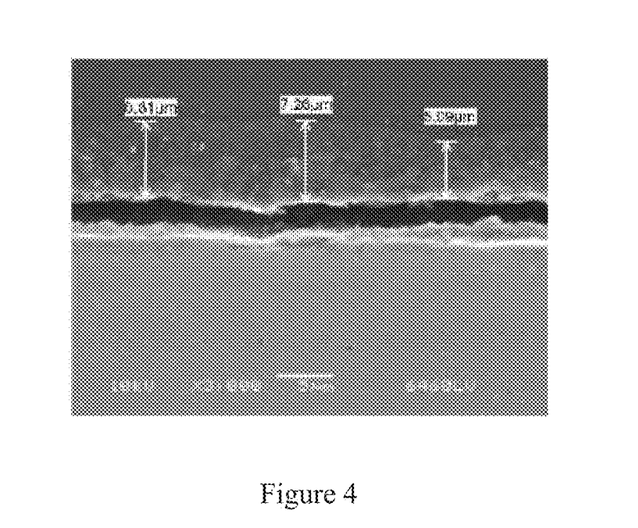
FIG. 4 shows the thickness of the coke layer when a 316L stainless steel substrate packing sheet is placed at minus three lines of a vacuum tower for 3 years and 5 months.

The layers of the combined product of the 304 stainless steel substrate and the nanomaterial according to the present invention were analyzed by X-ray photoelectron spectroscopy, and it was found that the layers are, from the outermost surface layer to the innermost layer, a silicon oxide layer, an amphoteric hydroxide layer, a chromium oxide layer and a substrate layer. There is no obvious intersection between the layers. The trend of the specific composition and the depth is shown in FIG. 3, wherein:

Silicon oxide layer: the thickness is 1-150 nm, this layer is mainly characterized in that silicon oxide as the anti-coking and anti-scaling materials and chromium oxide as the anti-coking and anti-scaling materials coexist, wherein trivalent chromium and hexavalent chromium coexist, wherein the trivalent chromium is the surface crystalline skeleton while the hexavalent chromium is the filler, and both maintain the stability of the layer elements and increase the corrosion resistance together.

Amphoteric hydroxide layer: the thickness is 150-500 nm, this layer is mainly composed of chromium oxide and chromium hydroxide layer.

Oxide layer: the thickness is 500-900 nm, this layer is mainly composed of chromium oxide and chromium elementary layer, while the content of the iron elementary layer in this layer is rapidly increased to the content which is equivalent to that of the 304 stainless steel substrate;

Substrate layer: the thickness is >900 nm, this layer is the normal composition of the 304 stainless steel substrate;

As can be seen from FIG. 1, there is no obvious interface between the substrate layer and the three layers on the surface, and the binding ability is strong.

The test of the binding ability between the anti-coking nanomaterial according to the present invention and the stainless steel substrate is as follows: the testing sheet including the anti-coking nanomaterial based on the stainless steel surface was heated to a preset high temperature, and then placed into a cold water to quench, the test was performed for several times repeatedly to observe the adhesion of the bonding layers.

The thermal shock test on the nano surface crystalline layer of the stainless steel substrate was performed according to the standard of GB/T5270-2005/ISO2819:1980. The testing temperature was increased successively to 100° C., 300° C., 500° C., 800° C. and 1000° C., no cracks or peeling on the surface were observed. Though the color of the surface was changed at a high temperature of 800° C. and 1000° C., the composition of the nanomaterial layers was maintained unchanged when tested by X-ray photoelectron spectroscopy. When stretched to a deformation of 30% at a high temperature of 1000° C., the nanomaterial had the same stretch ratio as the substrate.

In the present invention, the anti-coking nanomaterial layers based on the different types of commonly used stainless steel substrates (304, 316L, 317L and OCr13 stainless steels) were analyzed by X-ray photoelectron spectroscopy elemental analysis for many times. The composition of the elements was as shown in Table 1:

TABLE 1

Composition of the anti-coking nanomaterials based on the stainless steel according to the present invention

| Elements | Commonly used stainless steels Composition (wt. %) |
|---|---|
| Carbon | 0~3 |
| Oxygen | 23~38 |
| Chromium | 38~53 |
| Iron | 10~35 |
| Molybdenum | 0~2 |
| Nickel | 0~4 |
| Silicon | 3.5~5 |
| Calcium | 0~1 |
| Impurity elements | <1 |

Wherein, the testing results of the samples based on the 304 stainless steel substrate according to the present invention are shown in Table 2:

TABLE 2

Composition of the anti-coking nanomaterial based on the 304 substrate according to the present invention

| Items | Composition (wt. %) Elements | | | | | | |
|---|---|---|---|---|---|---|---|
| | C | O | Cr | Fe | Ni | Si | Ca |
| Composition wt. % | 0.71 | 34.62 | 42.81 | 13.11 | 3.1 | 4.73 | 0.92 |

Compared with the stainless steel surface, the surface of the nanomaterial according to the present invention is smoother and the friction coefficient is lower. If the friction coefficient is reduced by 33%, the surface of the nanomaterial will be beneficial to the flow of the fluid, and will be not easy to attach dirt. The sample based on the 304 substrate was taken as an example, the wearing test was performed on the surface of the nanomaterial of the present invention according to GB/T12444-2006. The result is shown as Table 3:

TABLE 3

Wearing test on the surface of the nanomaterial according to the present invention

| Testing positions | Friction strain ε | Friction f = 3.44ε (g) | Friction coefficient μ |
|---|---|---|---|
| Surface of the 304 substrate | 7.5 | 25.8 | 0.129 |
| Surface of the nanomaterial according to the present invention | 5.0 | 17.2 | 0.086 |

Compared with the existing substrates, aqueous and oil substances are not easy to form films on the surface of the nanomaterial according to the present invention. The wetting angles of the surface of the nanomaterial according to the present invention to water and organic substances increases, this shows that the nanomaterial according to the present invention does not easily wet aqueous and oil substances and have certain resistance on such substances. Wherein, the sample based on the 304 substrate was taken as an example, the wetting angle test was performed on the surface of the nanomaterial of the present invention according to GB/T24368-2009. The result is shown as Table 4:

TABLE 4

Wetting angle test of the nanomaterials according to the present invention

| Wetting property | Media surface | Wetting angle |
|---|---|---|
| DMF(dimethylformamide) | 304 substrate | 28.2 |
| | surface of the nanomaterial of the present invention | 34.6 |
| $H_2O$ | 304 substrate | 91.9 |
| | surface of the nanomaterial of the present invention | 101.6 |

In the present invention, according to different stainless steel substrates, the process is as follows: oil degreasing with hot alkaline and etching with alkali; washing with water; oxidizing; washing with water; electrolyzing; densifying; hardening;

the specific process is as follows:

(1) chemically degreasing and etching with alkali the stainless steel surface using a sodium hydroxide solution and a solution containing an alkali etching additive, wherein the temperature of the above solutions is controlled at 80-85° C., the treatment is performed for 10-15 min; followed by washing cyclically with hot water with a temperature of 80-85° C. for 3-5 min; wherein the amount of the sodium hydroxide solution and the solution containing the alkali etching additive is subjected to immerse the whole stainless steel surface.

(2) The composition of the oxidizing solution contains 200-300 g/L of $CrO_3$. At 75-90° C., the pH of the oxidizing solution is adjusted to 0.4-1.5 by adding a $H_2SO_4$ solution. The concentration of the $H_2SO_4$ solution is 98%; the time for oxidizing is 15-35 min;

(3) The composition of the electrolyte contains 100-150 g/L of $CrO_3$, 80-100 g/L of $Na_2SiO_3$, 15-20 g/L of nano silicon nitride and 3-5 g/L of nano silicon carbide. The pH of the electrolyte is adjusted to 0.5-1.5 by adding a $H_2SO_4$ solution, the temperature is controlled at 40-52° C. The stainless steel piece is taken as cathode. The current in the electrolyte is direct current, wherein, the initial current intensity is 40-42 A/m$^2$, and the electrolysis is performed for 10-25 min, and then the current intensity is gradually reduced to 4 A/m$^2$ according to the formula i=3+30/t, wherein i is current intensity and t is time. After electrolyzing for 14-18 min, the final current is controlled at 4-6 A/m$^2$; the washing is performed for 3-5 min at 25-40° C. under a pH of >3.

(4) The washed film layer is hardened at a temperature of 50-60° C. and a humidity of 60-70% for 3-5 hours, and then hardened at a temperature of 35-40° C. and a humidity of 40-50% for 48-72 hours, the treatment is finally completed.

The formed anti-coking nanomaterial layer based on the stainless steel surface according to the present invention is a chromium oxide and silicon oxide layer. There is no obvious bonding interface between the nanomaterial and the stainless steel substrate, and the nanomaterial is embedded on the surface of the stainless steel substrate. The main principle is to form a honeycomb surface structure on the surface of the stainless steel substrate by oxidizing the stainless steel substrate. The nanomaterial is filled in the honeycomb structure. The oxidizing process is performed by using an oxidizing solution to form a honeycomb microporous structure on the stainless steel surface, and then the electrolyzing and hardening process are performed to combine the nanomaterial with the stainless steel substrate.

The control of current intensity during electrolyzing is important. Short time and large current will lead to insufficient chromium and silicon elements in the honeycomb hole of the stainless steel surface, thereby leading to holes in the middle layer, insufficient atomic packing factor and deteriorated corrosion resistance. Therefore, the current intensity, the time and temperature for electrolyzing and the curve of the current intensity which decreases gradually in the later stage of electrolysis determine the atomic packing factor of the film layer.

The temperature and humidity for hardening is very important. When the temperature is too high, the film will age and crack. When the temperature is too low, the film will be soft and the filled metal and metal oxide crystalline are easy to fall off from the substrate during the rinsing and friction process. By testing, a relatively balanced temperature and time for hardening is selected to achieve industrialization.

According to the anti-coking nanomaterial of the present invention, a nanomaterial layer is formed on the stainless steel surface. The nanomaterial layer is composed of chromium oxide, silicon oxide and chromium hydroxide. The nanomaterial layer is combined with the stainless steel substrate surface in an inlaid manner without any bonding interface. There is no obvious fault for the thermal expansion coefficients between the nanomaterial layer and the stainless steel substrate. After treating the stainless steel substrate by using the method according to the present invention, a honeycomb porous structure is formed.

In the present invention, the pH of the oxidizing process is controlled at 0.4-1.5, the oxidizing time is controlled within 15-35 min. The pH of the electrolyzing process is controlled at 0.5-1.5, the temperature of the electrolyzing process is controlled at 40-52° C. The electrolyzing process uses the stainless steel as the cathode, and the initial current intensity is 40-42 A/m$^2$, and then decreases gradually according to the formula i=3+30/t, wherein i is current intensity and t is time. The time of the electrolyzing process is 25-55 min, wherein the electrolysis is performed for 10-25 min at an initial current intensity of 40-42 A/m$^2$, and then is performed for 14-18 min at the current intensity, which decreases gradually according to the formula i=3+30/t. The hardening is performed for 3-3.5 hours at a temperature of 50-60° C. and a humidity of 60-70%, and then 48-72 hours at a temperature of 35-40° C. and a humidity of 40-50%.

BRIEF DESCRIPTION OF THE DRAWINGS

Hereinafter, exemplary embodiments of the present invention will be described in detail with reference to the accompanying drawings, in which.

DESCRIPTION OF THE PREFERRED EMBODIMENTS

Further described the present invention in detail in conjunction with specific embodiments below, the examples are given only for illustrating the present invention and are not intended to limit the scope of the invention.

The experimental methods in the following examples are conventional methods unless otherwise specified. The raw materials, reagent materials, etc., in the following examples are commercially available products unless otherwise specified.

Example 1 Diesel Cracking Coking Test

A cracking furnace tube, which used the anti-coking nanomaterial based on a 317L stainless steel substrate according to the present invention (diesel was used (the distillation range was 186-316.2° C.)) and a untreated cracking furnace tube, which used an ordinary 317L stainless steel substrate, were tested by a Chinese Sinopec Research Institute, the result was shown as Table 5.

TABLE 5

| Parameters for cracking and scorching during the testing process | |
|---|---|
| Furnace types | Laboratory Test Device |
| Across-over temperature | 560° C. |
| Cracking temperature | 790° C. |
| Residence time | 0.33 S |
| Water/oil ratio (weight) | 1 |
| Export pressure MPa (Pressure gauge) | normal |
| Feeding amount | 150 g/h |
| Cracking time | 2 h |
| Scorching temperature | 790° C. |

After being tested, the coking amount on the surface of the untreated cracking furnace tube, which used the ordinary 317L stainless steel substrate, was 1.5464 g, the coking amount on the surface of the first cracking furnace tube, which uses the anti-coking nanomaterial based on the 317L stainless steel substrate according to the present invention, was 1.0487 g, the coking amount relatively reduced by 32%, the coking amount on the surface of the second cracking furnace tube, which used the anti-coking nanomaterial based on the 317L stainless steel substrate according to the present invention, was 1.0049 g, the coking amount relatively reduced by 35° %, this results show that the anti-coking nanomaterial according to the present invention has obvious anti-coking effect.

Example 2: Anti-Coking Test in Packed Vacuum Tower

A branch company of China Petroleum & Chemical Corporation designed high-sulfur and high-acid crude oil as the crude oil in an atmospheric and vacuum distillation device of a crude oil deterioration reconstruction project.

(1) An untreated packing sheet based on a 316L stainless steel substrate and a packing sheet using the anti-coking nanomaterial based on a 316L stainless steel substrate according to the present invention as the surface layer were placed at the bottom of the third section of a packed vacuum tower. Specific temperature was shown as Table 6:

TABLE 6

| Temperature of packing sheets to be tested | | | |
|---|---|---|---|
| Minus three lines temperature(° C.) | Sulfur content | Acid value | Carbon residue content |
| 213~331.2 | 0.77 m % | 1.06 | 2.26% |

Figure 5:
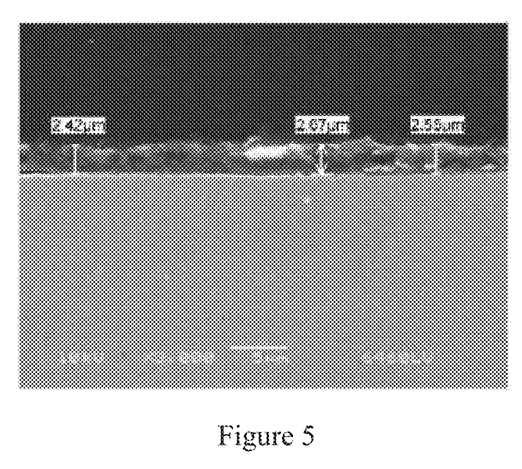
FIG. 5 shows the thickness of the coke layer when a 316L stainless steel substrate packing sheet treated by the nanocrystalline material according to the present invention is placed at minus three lines of a vacuum tower for 3 years and 5 months.
Figure 6:
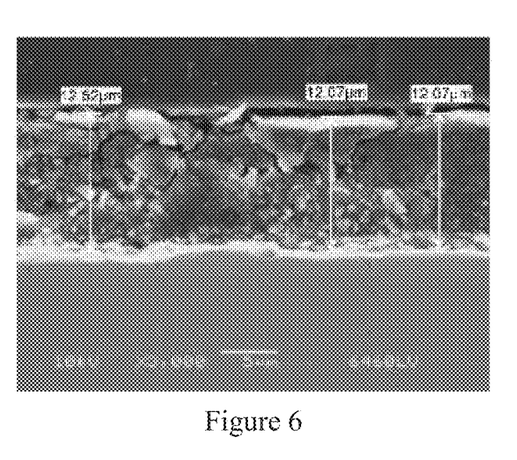
FIG. 6 shows the thickness of the coke layer when a 317L stainless steel substrate packing sheet is placed in the washing section of a vacuum tower for 3 years and 5 months.

After being operated for 3 years and 5 months, the above-mentioned packing sheets were subjected to metallographic preparation to observe the thickness of the coking layer. The result was shown as follows:

The thickness of the coking layer of the untreated packing sheet based on the ordinary 316L stainless steel substrate was shown in FIG. 5, the thickness of the coking layer of the packing sheet using the anti-coking nanomaterial based on the 316L stainless steel substrate according to the present invention was shown in FIG. 6. When comparing the two packing sheets, it can be seen that the thickness of the coking layer in FIG. 5 was 6.39 μm, while the thickness of the coking layer in FIG. 6 (the packing sheet using the anti-coking nanomaterial based on the 316L stainless steel substrate according to the present invention as the nano surface layer) was 2.55 μm, the coking amount relatively reduced by 60.1%.

(2) An untreated packing sheet based on a 317L stainless steel substrate and a packing sheet using the anti-coking nanomaterial based on a 317L stainless steel substrate according to the present invention as the surface layer were placed at the bottom of the fourth section of a packed vacuum tower. Specific temperature was shown as Table 7:

TABLE 7

| Temperature of packing sheets to be tested | | | |
|---|---|---|---|
| Minus four lines temperature(° C.) | Sulfur content | Acid value | Carbon residue content |
| 329-388 | 0.77 m % | 1.06 | 11.4% |

Figure 7:
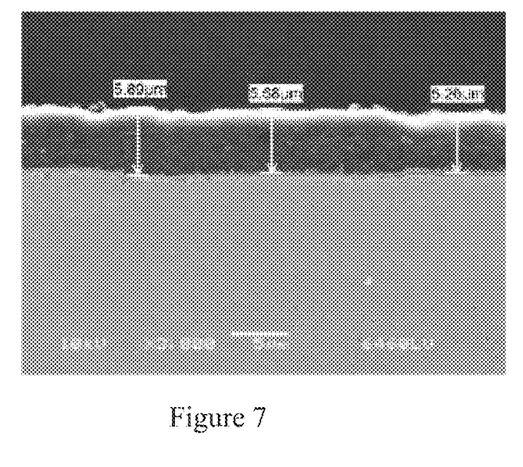
FIG. 7 shows the thickness of the coke layer when a 317L stainless steel substrate packing sheet treated by the nanocrystalline material according to the present invention is placed in the washing section of a vacuum tower for 3 years and 5 months.
Figure 8:
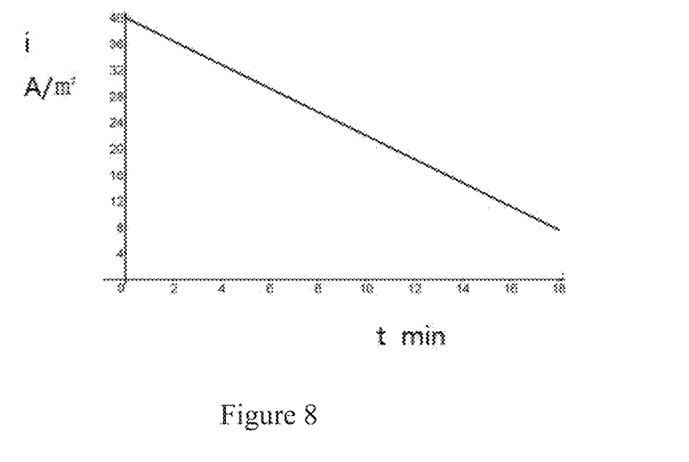
FIG. 8 is a current-time profile according to the formula i=40-2.33t (wherein, i is current intensity, t is dense duration time (min)) after electrolyzing for 15 min.

After being operated for 3 years and 5 months, the above-mentioned packing sheets were subjected to metallographic preparation to observe the thickness of the coking layer. The result was shown as follows:

The thickness of the coking layer of the untreated packing sheet based on the ordinary 317L stainless steel substrate was shown in FIG. 7, the thickness of the coking layer of the packing sheet using the anti-coking nanomaterial based on the 317L stainless steel substrate according to the present invention was shown in FIG. 8. When comparing the two packing sheets, it can be seen that the thickness of the coking layer in FIG. 7 was 12.22 μm, while the thickness of the coking layer in FIG. 8 (the packing sheet using the anti-coking nanomaterial based on the 317L stainless steel substrate according to the present invention as the nano surface layer) was 5.61 μm, the coking amount relatively reduced by 54.1%.

Example 3: Silicon Content Test of the Anti-Coking Nanomaterial of the Present Invention The inventors have found that the content of silicon has a decisive influence on the anti-coking effect of the stainless steel surface, the more the content of silicon on the stainless steel surface was, the better the anti-coking effect was. The silicon content was determined by controlling the concentration of $Na_2SiO_3$ and nano silicon nitride. The 304 stainless steel substrate material was taken as an example, the results were shown in Tables 7 and 8.

TABLE 7

Silicon content of the anti-coking nanomaterial

| | Concentration | | | | | | | | |
|---|---|---|---|---|---|---|---|---|---|
| $Na_2SiO_3$ g/L | 0 | 20 | 40 | 60 | 80 | 100 | 120 | 130 | 150 |
| Maximum Si content | 0.31 | 1.18 | 1.45 | 2.22 | 2.87 | 2.93 | 2.53 | 2.50 | 2.42 |

It can be seen from Table 7 that the content of silicon in the anti-coking nanomaterial was relatively high when the concentration of $Na_2SiO_3$ was 80-100 g/L.

TABLE 8

Silicon content of the anti-coking nanomaterial

| | Concentration | | | | | | | |
|---|---|---|---|---|---|---|---|---|
| Nano silicon nitride g/L | 0 | 5 | 10 | 15 | 20 | 25 | 30 | 40 |
| Maximum Si content | 2.91 | 3.52 | 4.07 | 4.55 | 4.88 | 5.06 | 5.18 | 5.22 |

It can be seen from Table 8, nano silicon nitride has certain influence on the silicon content of the anti-coking nanomaterial, however, too much silicon nitride will increase the roughness of the anti-coking nanomaterial, decrease the adhesion of the anti-coking nanomaterial layer in fluid environments, and this will be unfavorable for anti-coking property. Therefore, the best range of the silicon nitride of the present invention is 15-20 g/L.

Example 4: Electrolyzing Test

The inventors have found that the change in current during electrolysis has a large influence on the smoothness of the anti-coking nanomaterial surface. Therefore, the inventors determined the change of the friction coefficient based on the change of the current intensity. The less the friction coefficient was, the better the anti-coking effect was, thus, the surface will be not easy to adhere dirt.

Figure 9:
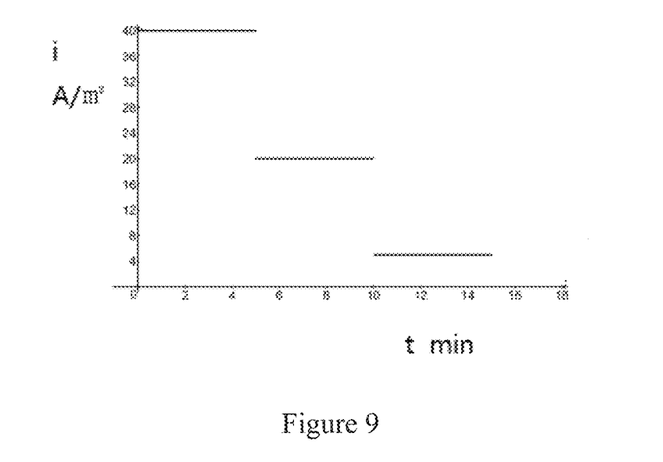
FIG. 9 is a current-time profile after electrolyzing for 15 min, wherein at 0-5 min, the current is 40 A/m$^2$; at 5-10 min, the current is 20 A/m$^2$; at 10-15 min, the current is 15 A/m$^2$.
Figure 10:
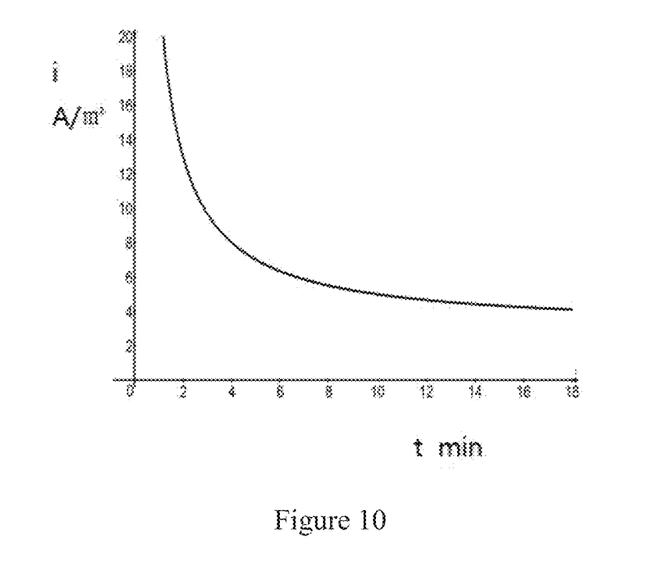
FIG. 10 is a current-time profile according to the formula i=30+30/t (wherein, i is current intensity, t is dense duration time (min)) after electrolyzing for 15 min.

As shown in FIGS. 9-11, X axis is time (min), Y axis is current intensity (A/m$^2$);

Scheme 1: In FIG. 9, the current intensity i=40-2.33t (i is current intensity, t is duration time);

Scheme 2: In FIG. 10, the current intensity was 40 A/m$^2$, which was kept for 0-5 min; the current intensity was 20 A/m$^2$, which was kept for 5-10 min; the current intensity was 5 A/m$^2$, which was kept for 10-15 min.

Scheme 3 (the current was controlled according to the method of the present invention): In FIG. 11, the current intensity i=3-30/t (i is current intensity, t is duration time);

The result was shown in Table 9:

TABLE 9 friction coefficients of the anti-coking nanomaterial based on a 304 stainless steel substrate:

| Schemes | Friction coefficient μ |
|---|---|
| Scheme 1 | 0.095 |
| Scheme 2 | 0.103 |
| Scheme 3 | 0.086 |

Conclusion: Different ways of changing the current lead to different atomic packing factor of stainless steel nano surfaces. It can be seen from this table, the less the friction coefficient μ was, the higher the atomic packing factor on the nanocrystalline surface was, the smoother the nano-surface film layer was, this will result in good adhesion effect of the scaling layer.

Example 5: Preparation of the Nanocrystalline Material Based on a Stainless Steel Surface (304 Substrate) According to the Present Invention (1) Sodium hydroxide solution with a concentration of 7% and a solution containing 0.5% of HDW-1050 alkali etching additive was used to chemically degrease and etch with alkali a stainless steel surface (a 304 substrate). The total amount of the entire solution was adequate to fully immerse the stainless steel surface. The temperature of the above solution was controlled at 80° C. The operation was performed for 15 min. After that, water with a temperature of 80° C. was used for washing for 3 min.

(2) The composition of the used oxidizing solution contained 300 g/L of $CrO_3$. At 78° C., $H_2SO_4$ solution with a concentration of 98% was used to adjust the pH value to 1.3, the time for oxidizing was 15 min, after that, water under normal temperature was used for washing for 3 min.

(3) The composition of the used electrolytic solution contained 100 g/L of $CrO_3$, 100 g/L of $Na_2SiO_3$, 18 g/L of nano silicon nitride, 3 g/L of nano silicon carbide. $H_2SO_4$ solution with a concentration of 98% was used to adjust the pH value to 1.3. The temperature was controlled at 40° C. The stainless steel piece (304 substrate) was used as cathode, on the basis of the surface area of the stainless steel, the electrolysis was performed for 10 min with a current intensity of 40 A/m$^2$ firstly, and then for 15 min with a current intensity, which gradually reduced according to the formula i=3+30/t (i is current intensity, A/m$^2$, t is duration time, min). After that, the electrolyte on the surface of the stainless steel piece was washed at room temperature.

(4) The stainless steel piece (304 substrate) was placed in an environment with a temperature of 55° C. and a humidity of 60% to harden for 3 hours. After that, the film layer was placed at a temperature of 38° C. and a humidity of 45% to harden for 72 hours. Thus, an anti-coking nanomaterial based on the stainless steel surface (304 substrate) was obtained.

The testing results of the anti-coking nanomaterial based on 304 stainless steel of the present invention were as follows: the nanocrystalline material contained 0.71/of carbon, 34.62% of oxygen, 42.81% of chromium, 13.11% of iron, 3.1% of nickel, 4.73% of silicon, 0.92% of calcium, and with the balance being remaining amount of impurity elements.

The invention claimed is:

1. A method for preparing an anti-coking nanocrystalline material characterized in that the method comprises the following steps:
   (1) chemically degreasing and etching with alkali a stainless steel surface using a sodium hydroxide solution and a solution containing an alkali etching additive, followed by washing with water;
   (2) oxidizing the stainless steel surface treated in the step (1) by an oxidizing solution, followed by washing with water;
   (3) immersing the stainless steel surface treated in the step (2) as a cathode in an electrolyte to electrolyze, followed by washing with water; and
   (4) placing the stainless steel surface treated in the step (3) at a temperature of 50-60° C. and a humidity of 60-70%, and then placing at a temperature of 35-40° C. and a humidity of 40-50% for hardening.

2. The method according to claim 1, characterized in that, in the step (1), a temperature of the sodium hydroxide solution and the solution containing the alkali etching additive is 80-85° C.;
   a concentration of the sodium hydroxide solution is 6.5-8 wt. %;
   a concentration of the solution containing the alkali etching additive is 0.3-0.5 wt. %;
   the alkali etching additive is an alkali etching additive to chemically etch with alkali;
   the chemically degreasing and etching with alkali is carried out for 10-15 minutes; and
   the washing with water is performed by using water with a temperature of 80-85° C., and a time for the washing is 3-5 minutes.

3. The method according to claim 1, characterized in that, in the step (2), preferably, the oxidizing solution contains 200-300 g/L of $CrO_3$;
   a temperature of the oxidizing solution is 75-90° C.;
   a pH of the oxidizing solution is adjusted to 0.4-1.5 by adding a $H_2SO_4$ solution into the oxidizing solution; a concentration of the $H_2SO_4$ solution is 98 wt. %;
   a time for oxidizing is 15-35 minutes; and
   the washing with water after oxidizing in the step (2) is performed cyclically by using water at 25-40° C. for 3-5 minutes; and a pH of the water is >3.

4. The method according to claim 1, characterized in that, in the step (3), the electrolyte contains 100-150 g/L of $CrO_3$, 80-100 g/L of $Na_2SiO_3$, 15-20 g/L of nano silicon nitride, and 3-5 g/L of nano silicon carbide;
   a temperature of the electrolyte is 40-52° C.;
   a pH of the electrolyte is adjusted to 0.5-1.5 by adding a $H_2SO_4$ solution into the electrolyte; and a concentration of the $H_2SO_4$ solution is 98 wt. %;
   a current for electrolyzing is carried out in the following manner:
   an initial current intensity is 40-42 $A/m^2$, and then the current intensity is gradually reduced to 4 $A/m^2$ according to a formula i=3+30/t, wherein i is current intensity in $A/m^2$ and t is time in minutes;
   a time for electrolyzing is 25-55 minutes; and
   the washing with water is performed cyclically by using water at 25-40° C. for 3-5 minutes; and a pH of the water is >3.

5. The method according to claim 1, characterized in that, in the step (4), the placing of the stainless steel surface treated in the step (3) at a temperature of 50-60° C. and a humidity of 60-70% is performed for 3-3.5 hours; and the placing at a temperature of 35-40° C. and a humidity of 40-50% for hardening is performed for 48-72 hours.

6. The method according to claim 4, characterized in that, the electrolyzing is carried out for 10-25 minutes at an initial current intensity of 40-42 $A/m^2$, and then electrolyzing at a current intensity gradually reduced to 4 $A/m^2$ according to the formula i=3+30/t during 14-18 minutes.

* * * * *